United States Patent
Michishita et al.

(10) Patent No.: US 8,319,487 B2
(45) Date of Patent: Nov. 27, 2012

(54) NON-ISOLATED CURRENT-MODE-CONTROLLED SWITCHING VOLTAGE REGULATOR

(75) Inventors: Yuusuke Michishita, Ikeda (JP); Shinya Shimizu, Itami (JP)

(73) Assignee: Ricoh Company, Ltd., Tokyo (JP)

( * ) Notice: Subject to any disclaimer, the term of this patent is extended or adjusted under 35 U.S.C. 154(b) by 714 days.

(21) Appl. No.: 12/554,076

(22) Filed: Sep. 4, 2009

(65) Prior Publication Data
US 2009/0322299 A1 Dec. 31, 2009

(30) Foreign Application Priority Data
Sep. 4, 2008 (JP) ................................. 2008-226789

(51) Int. Cl.
*G05F 1/00* (2006.01)
(52) U.S. Cl. ...................................... 323/284; 323/223
(58) Field of Classification Search .................. 323/223, 323/282, 283, 284, 285, 288
See application file for complete search history.

(56) References Cited

U.S. PATENT DOCUMENTS

| | | | |
|---|---|---|---|
| 7,061,213 B2 * | 6/2006 | Yoshida | 323/224 |
| 7,173,404 B2 * | 2/2007 | Wu | 323/283 |
| 7,479,773 B2 | 1/2009 | Michishita | |
| 2008/0197828 A1 | 8/2008 | Michishita | |

FOREIGN PATENT DOCUMENTS

| | | |
|---|---|---|
| JP | 2007-209180 | 8/2007 |
| JP | 2008-67495 | 3/2008 |
| JP | 2008-92712 | 4/2008 |
| JP | 2008-206214 | 9/2008 |
| JP | 2008-228514 | 9/2008 |

* cited by examiner

Primary Examiner — Harry Behm
Assistant Examiner — Matthew Grubb
(74) Attorney, Agent, or Firm — Cooper & Dunham LLP

(57) ABSTRACT

A novel voltage regulator includes an indictor, a switching transistor, a rectifier, an error amplifier circuit, a first voltage comparator circuit, a second voltage comparator circuit, an oscillator circuit, and a driver circuit. The first voltage comparator circuit outputs a modulation signal. The second voltage comparator circuit activates an enable signal when the error voltage exceeds the second reference voltage. The oscillator circuit outputs a clock signal with a fixed frequency according to the enable signal. The oscillator circuit enters a first state when the enable signal is activated and deactivated within a period of time shorter than a threshold time, and enters a second state when the enable signal remains activated during a period of time longer than the threshold time. The driver circuit generates the switching control signal based on the clock signal and the modulation signal.

6 Claims, 7 Drawing Sheets

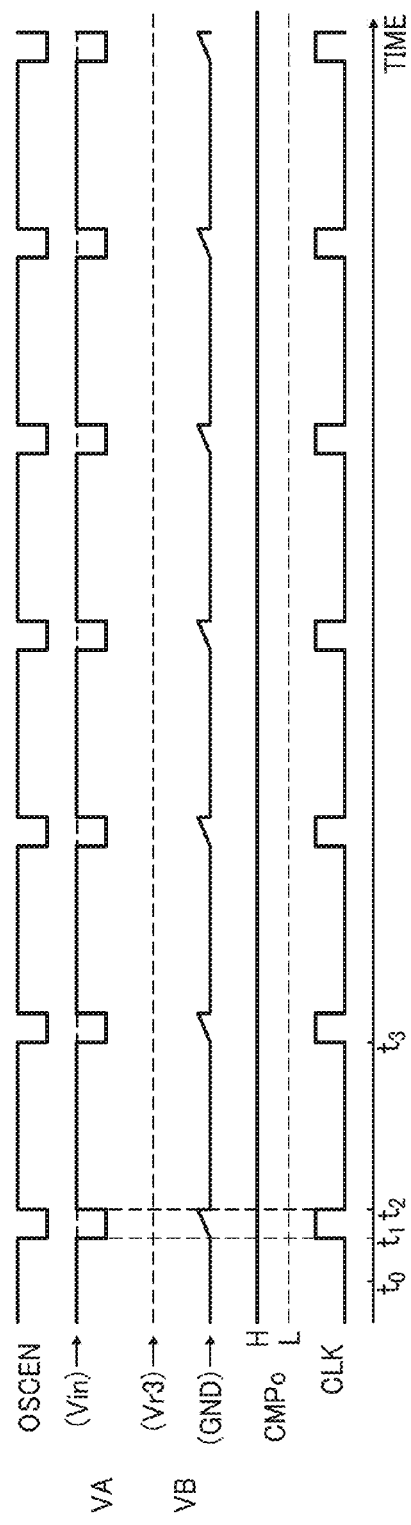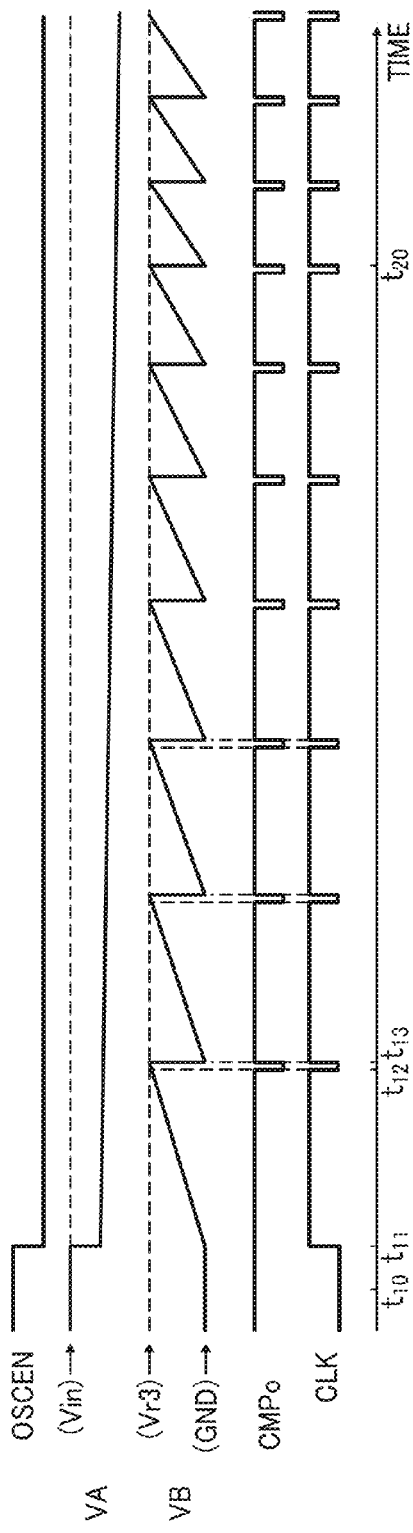

NON-ISOLATED CURRENT-MODE-CONTROLLED SWITCHING VOLTAGE REGULATOR

BACKGROUND OF THE INVENTION

1. Technical Field

The present invention relates to a voltage regulator, and more particularly, to a non-isolated current-mode-controlled switching voltage regulator that regulates an input DC voltage to output a constant DC voltage while switching control mode between PWM mode and VFM mode depending on a current output to load circuitry.

2. Discussion of the Background

With currently increasing concern for environmental and ecological issues, there is a growing need for energy-saving electronic devices, particularly those operating with battery-based power supply. Two common approaches to conserving energy in electronic equipment are to reduce power consumed by functional units of the electronic device, and to improve efficiency and reduce energy loss of power circuitry supplying the electronic device.

A non-isolated switching voltage regulator is an example of a high-efficiency power source used in small portable electronic devices, in which an output transistor switches on and off current flow to temporarily store an input energy in an inductor and release the stored energy at a constant voltage higher or lower than that of the input energy.

One major technique used to control operation of a switching voltage regulator is pulse width modulation (PWM) control, which adjusts an ON time or duty cycle of a switching transistor with a clock signal having a constant frequency and a variable pulse width or pulse duration. Another control technique commonly used is variable frequency modulation (VFM) control, also referred to as pulse frequency modulation (PFM) control, which adjusts a switching frequency of a switching transistor with a clock signal having a variable frequency and a constant pulse duration. Some VFM control schemes vary a clock frequency seamlessly using a variable oscillator, and others create a variable-frequency signal by skipping pulses in an original pulse train oscillating at a constant frequency.

Typically, power consumed by a switching voltage regulator is proportional to the switching frequency with which a switching transistor is operated. The fact indicates that with low power supplied to load circuitry, PWM control is less efficient in terms of power consumption than VFM control, since the former constantly switches the output transistor at a fixed frequency whereas the latter can adjust the switching frequency to decrease corresponding to the low-load condition. On the other hand, VFM control is inferior to its counterpart in terms of operational stability, for varying the switching frequency can cause noise and ripple in the output of the voltage regulator.

To combine the advantages of PWM control and VFM control to obtain high power efficiency, some conventional voltage regulators incorporate dual-control mode power supply circuitry that can switch control mode between PWM mode and VFM mode according to the load condition.

FIG. 1 is a circuit diagram illustrating a conventional switching voltage regulator 100 employing PWM and VFM control modes.

As shown in FIG. 1, the voltage regulator 100 is a step-down or buck DC-DC converter with synchronous rectification, which converts a voltage Vin input to an input terminal IN to output a constant voltage Vout to an output terminal OUT for supply to a load circuit 120.

The voltage regulator 100 has an output stage formed of a switching transistor M101 and a synchronous rectifier transistor M102, the former being a P-channel metal-oxide semiconductor (PMOS) transistor and the latter an N-channel metal-oxide semiconductor (NMOS) transistor, with a node LX therebetween connected to an inductor L101 and an output capacitor Co.

The voltage regulator 101 has control circuitry including a pair of voltage sensing resistors R101 and R102, a first reference voltage generator 102, an error amplifier 103, a first comparator 104, a current/voltage converter 110, a slope voltage generator 111, an adder circuit 112, a second voltage generator 107, a second comparator 108, an oscillator 109, a reset-set (RS) flip-flop 105, and an inverter or switching controller 106.

In the voltage regulator 101, the output transistors M101 and M102 are connected in series between the input terminal IN and a ground GND, with the node LX therebetween connected to the inductor L101. The inductor L1 is connected between the node LX and the output terminal OUT, and the capacitor Co is connected between the output terminal OUT and the ground GND. The output terminal OUT is connected to the load circuit 120 as well as to the current/voltage converter 110.

The resistors R101 and R102 are connected in series between the output terminal OUT and the ground GND to form a voltage divider. The error amplifier 103 has an inverting input connected to the voltage divider, a non-inverting input connected to the first voltage generator 102, and an output connected to the first and second comparators 104 and 108.

The voltage divider resistors R1 and R2 output a feedback voltage Vfb proportional to the output voltage Vout, while the first voltage generator 102 outputs a first reference voltage Vr1 for comparison with the feedback voltage Vfb. Based on a difference between the two input voltages Vfb and Vr1, the error amplifier 103 outputs an amplified error voltage Ve at its output terminal, which increases as the output voltage Vout decreases, and decreases as the output voltage Vout increases.

The current/voltage converter 110 is connected to the inductor node LX. The adder circuit 112 is connected between the current/voltage converter 110 and the slope voltage generator 111. The comparator 104 has an inverting input connected to the output of the error amplifier 103, and a non-inverting input connected to the adder circuit 112.

The current/voltage converter 110 generates a current-sensing voltage Vsen by amplifying a difference between the input voltage Vin and a nodal voltage VLX at the inducer node LX. The amplified voltage Vsen is proportional to the inductor current iL.

The slope voltage generator 111 generates a sawtooth slope voltage Vslp for addition to the current-sensing voltage Vsen. The slope voltage Vslp is added to the current-sensing voltage Vsen by the adder circuit 12 to generate a ramp voltage Vc substantially proportional to the inductor current iL.

The first comparator 104 compares the voltages Vc and Ve against each other to generate a pulse width modulation signal Spwm for output to the driver circuit DRV, which goes high when the voltage Vc exceeds Ve, and low when the voltage Vc falls to Ve or below.

The second comparator 108 has an inverting input connected to the error amplifier 103, a non-inverting input connected to the second reference voltage generator 107, and an output connected to the oscillator circuit 109.

The second reference voltage generator 7 generates a second reference voltage Vr2 for comparison with the error voltage Ve. By comparing the error amplifier output Ve against the reference voltage Vr2, the comparator 108 generates an oscillator enable signal OSCEN for output to the oscillator circuit 109, which goes low when the voltage Ve exceeds Vr2, and high when the voltage Ve falls to Vr2 or below.

The oscillator circuit 109 provides a clock signal CLK to the driver circuit DRV depending on the status of the enable signal OSCEN.

The RS flip-flop 105 has a reset or "R" input connected to the first comparator 104, and a set or "S" input connected to the oscillator circuit 109, and a non-inverting or "Q" output connected to the controller 106. The controller 106 has a first input In connected to the flip-flop Q output, a second input Lx connected to the inductor node LX, a first output P connected to the gate of the switching transistor M101, and a second output N connected to the gate of the synchronous rectifier transistor M102.

Receiving the pulse signal Spwm at the R input and the clock signal CLK at the S input, the RS flip-flop 105 causes its Q output to go high when the signal CLK goes high, and to go low when the signal Spwm goes high. The switching controller 106 provides first and second control signals PHS and NLS, respectively, to control operation of the respective transistors M101 and M102 according to the status of the first and second input terminals In and Lx.

In such a configuration, the voltage regulator 100 can control operation of the switching transistor M1 either in VFM mode or in PWM mode depending on a current iout output to the load circuit 120.

FIG. 2 is a timing diagram showing waveforms of the signals in the voltage regulator 100 operating in VFM mode and in PWM mode.

During operation in VFM control mode, the output current iout supplied to the load 120 is relatively low, so that the error voltage Ve generally remains below the second reference voltage Vr2. In this mode, the smaller the output current iout, the faster the output voltage Vout increases and the error voltage Ve decreases, resulting in a shorter period of time during which the switching transistor M101 remains on. On the other hand, the smaller the output current iout, the slower the output voltage Vout decreases, resulting in a longer period of time during which the switching transistor M101 remains off. With an output current sufficiently small, this results in a longer time interval and a smaller frequency with which the switching transistor M101 turns on.

The voltage regulator 100 switches control mode from VFM mode to PWM mode when the output current iout increases to raise the switching frequency, maintaining the error voltage Ve higher than the second reference voltage Vr2.

During operation in PWM mode control, the output current iout supplied to the load 120 is relatively high, so that the error voltage Ve generally remains above the second reference voltage Vr2. Thus, the output OSCEN of the second voltage comparator circuit VC2 remains low to cause the oscillator circuit OSC to output a periodic pulse clock signal CLK oscillating at a constant frequency.

When the clock signal CLK goes high, the RS flip-flop 105 sets the Q output from low to high, so that the switching controller 106 causes the switching transistor M101 to turn on and the synchronous rectifier transistor M102 to turn off. This causes a current iL to flow into the inductor L101 from the input terminal IN, the amount of which increases in proportion to a difference between the input and output voltages Vin and Vout.

At the same time, the adder circuit 112 outputs a ramp voltage Vc by adding a slope voltage Vslp to a voltage Vsen proportional to the inductor current iL, which increases from the ground level GND in accordance with the increase in the inductor current iL.

When the voltage Vc exceeds the error voltage Ve, the output Spwm of the first comparator 104 goes from low to high, causing the RS flip-flop 105 to reset the Q output from high to low. In response to the first input In going low, the controller 106 applies high voltage signals PHS and NLS to the gates of the corresponding transistors, thereby causing the switching transistor M101 to turn off and the synchronous rectifier transistor M102 to turn on.

With the switching transistor M101 thus shut off, the ramp voltage Vc falls to the ground voltage GND, resulting in the output Spwm of the first comparator 104 going from high to low. As the transistor M101 shut off no longer connects the input terminal IN to the inductor node LX, the inductor 101L draws a current iL from the ground GND through the synchronous rectifier transistor M102, the amount of which gradually decreases in proportion to the output voltage Vout.

Before the inductor current iL falls to zero, the oscillator circuit 109 outputs another pulse CLK to start another operational cycle of the voltage regulator 101.

During operation in PWM control mode described above, the greater the output current iout, the shorter the period of time during which the switching transistor M101 remains on. In order for the voltage regulator to smoothly change its control mode, properly setting the inductor current iL during transition from VFM mode to PWM mode is important.

FIG. 3 shows waveforms of the inductor current iL in the voltage regulator 100 during transition from VFM mode to PWM mode with the output current iout transitioning from below to above a critical current ia with which the switching regulator enters from discontinuous operation to continuous operation.

In FIG. 3, the waveform iLa represents the inductor current measured when the VFM/PWM transition occurs at time ta where the output current iout is below the critical current ia so that the voltage regulator 100 operates in discontinuous mode. In this case, switching control mode from VFM to PWM abruptly raises the switching frequency of the transistor M101 and hence the energy supplied to the inductor L101, resulting in a steep surge in the output voltage Vout. The abnormal rise of the output voltage Vout continues until time tb at which the output current iout is increased to the critical current ia so that the voltage regulator 100 enters continuous mode operation.

The waveform iLc represents the inductor current measured when the VFM/PWM transition occurs at time tc where the output current iout is increased above the critical current ia after the voltage regulator 100 enters continuous mode operation. In this case, while the voltage regulator 100 operates in continuous mode, the switching transistor 101 controlled in VFM mode ends one switching cycle prematurely before the inductor current iLc returns to the baseline level, resulting in the inductor current iLc becoming improperly high in the subsequent switching cycle. The improperly high inductor current iLc excessively increases the output voltage Vout to extend the duration of the switching cycle, which in turn excessively decreases the output voltage Vout during the long switching cycle.

The waveform iLb represents the inductor current measured when the VFM/PWM transition occurs at time tb. In contrast to the other cases, under this condition, the voltage regulator 100 can smoothly switch from VFM to PWM control mode without causing anomalies in the output voltage Vout. The measurements indicate that synchronizing transition from VFM to PWM control mode with the output current iout reaching the critical current ia effects stable operation of a dual-control mode switching voltage regulator.

In addition, the cases described in FIG. 3 differ in the amount of current supplied to the inductor L101 per one switching cycle during VFM mode operation. Increasing the inductor current per switching cycle can improve power efficiency in VFM mode operation, since it reduces switching frequency of the output transistor which is proportional to the amount of power consumed by the voltage regulator. However, as can be seen from the fluctuations in the waveform iLc, this involves the risk of destabilizing voltage regulation during transition from VFM mode to PWM mode.

Several techniques have been proposed to determine the timing at which a dual-control mode switching transistor switches the control mode from VFM mode to PWM mode.

For example, one conventional method proposes a voltage regulator that determines the timing for control mode transition according to a result of comparing duty cycles of a drive signal of a switching transistor, an output signal of a PWM comparator, and a variable frequency clock signal. According to this method, the duty cycle of each control signal is transformed to a proportional voltage, based on which comparator circuitry compares the duty cycle of the clock signal against those of the PWM signal and the clock signal to switch the control mode according to the comparison results.

Another conventional method provides a voltage regulator that adjusts a PWM control signal when the PWM control signal has a pulse width smaller than that of a VFM control signal. According to this method, a differential signal generator generates a signal indicating a difference between the PWM pulse width and VFM pulse width. The differential signal is input to a variable frequency oscillator that controls frequency of a reference signal used to generate the PWM control signal.

A drawback common to the conventional methods described above is that complicated and bulky circuitry is required for timing determination. That is, the former method involves separate signal converters to transform the three control signals, as well as voltage comparators to compare the transformed signals, while the latter includes the differential signal generator and the variable oscillator, which may require several electronic components. Moreover, both of the conventional methods fail to take into account the power efficiency during VFM control mode operation.

Thus, what is needed is a simple and power-efficient dual-control mode voltage regulator that can smoothly switch control mode from VFM to PWM without causing variations in the output voltage.

BRIEF SUMMARY

This disclosure describes a novel non-isolated current-mode-controlled switching voltage regulator that converts a voltage input to an input terminal to output a constant voltage to an output terminal while switching control mode between PWM mode and VFM mode depending on a current output to the output terminal.

In one aspect of the disclosure, the novel voltage regulator includes an indictor, a switching transistor, a rectifier, an error amplifier circuit, a first voltage comparator circuit, a second voltage comparator circuit, an oscillator circuit, and a driver circuit. The inductor is connected between the input terminal and the output terminal. The switching transistor charges the inductor with the input voltage by switching on and off according to a switching control signal. The rectifier discharges the inductor when the switching transistor switches off. The error amplifier circuit amplifies a difference between a first reference voltage and a feedback voltage proportional to the output voltage, and outputs an error voltage indicating the amplified voltage difference. The first voltage comparator circuit compares the error voltage against a ramp voltage generated by adding a slope compensation voltage to a current-sensing voltage corresponding to a current flowing through the inductor, and outputs a modulation signal pulsed to indicate a result of comparison between the error voltage and the ramp voltage. The second voltage comparator circuit compares the error voltage against a second reference voltage, and activates an enable signal when the error voltage exceeds the second reference voltage. The oscillator circuit outputs a clock signal with a fixed frequency according to the enable signal. The oscillator circuit enters a first state when the enable signal is activated and deactivated within a period of time shorter than a threshold time, and enters a second state when the enable signal remains activated during a period of time longer than the threshold time. The clock signal is pulsed with a variable frequency when the oscillator circuit is in the first state. The clock signal oscillates with a frequency constantly increasing from an initial level before stabilizing at the fixed frequency when the oscillator circuit is in the second state. The driver circuit generates the switching control signal based on the clock signal and the modulation signal. The switching control signal causes the switching transistor to turn on in response to a pulse in the clock signal, and to turn off in response to a pulse in the modulation signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6A and 6B are diagrams showing waveforms of control signals in the oscillator circuit of FIG. 5 in VFM control mode and during transition from VFM mode to PWM mode, respectively.

DETAILED DESCRIPTION OF EXEMPLARY EMBODIMENTS

Figure 1:
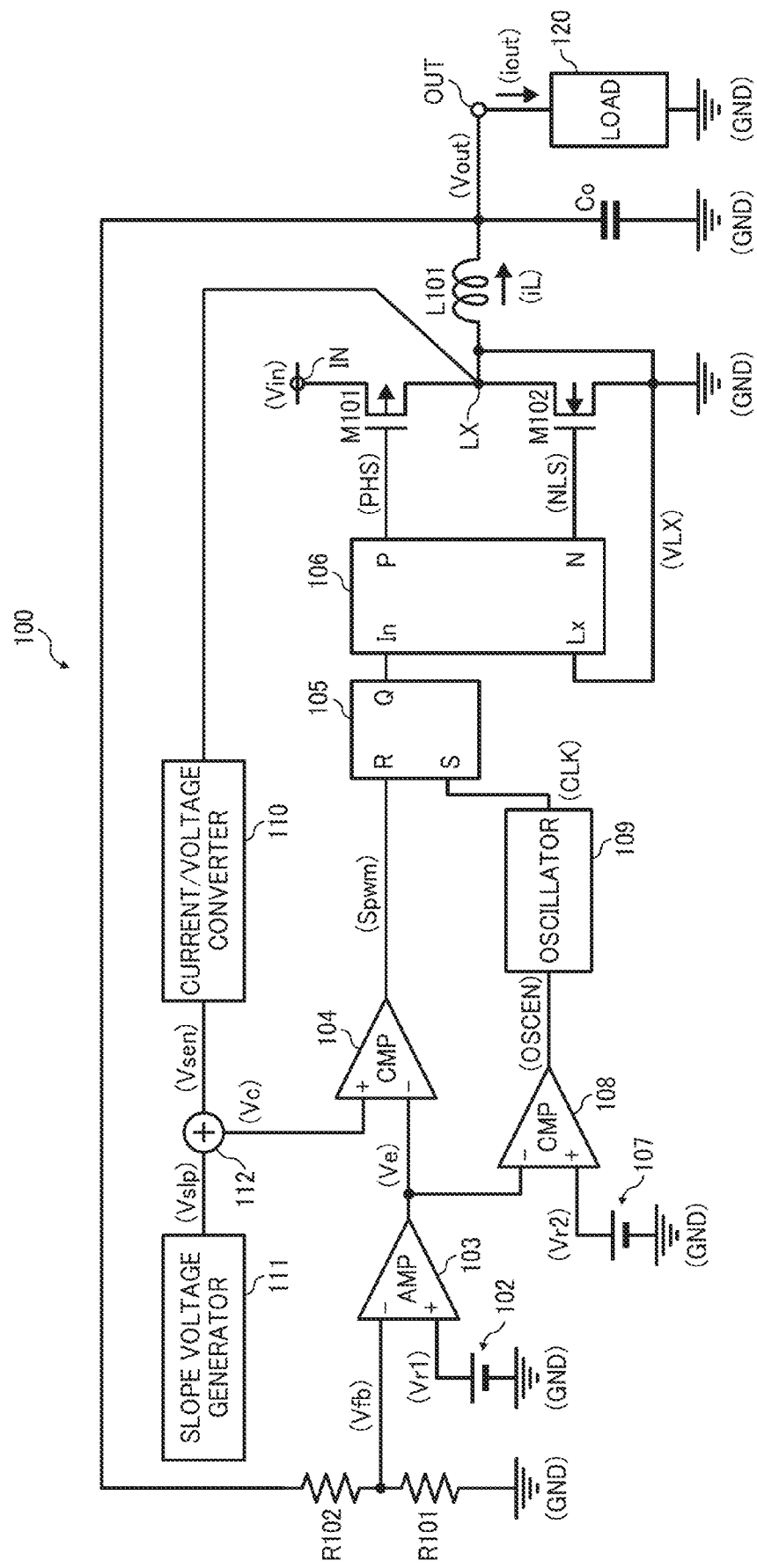
FIG. 1 is a circuit diagram illustrating a conventional switching voltage regulator employing PWM and VFM control modes.
Figure 2:
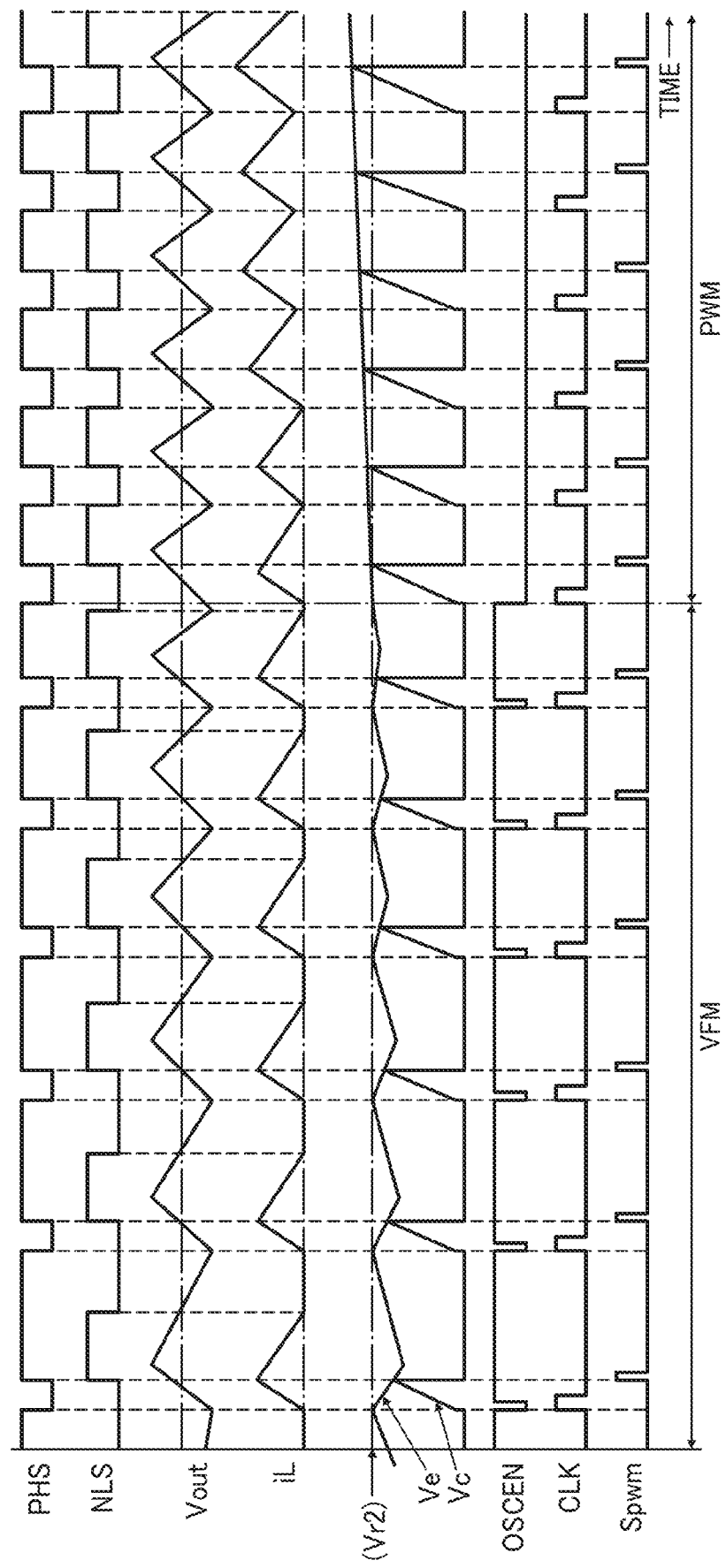
FIG. 2 is a timing diagram showing waveforms of signals in the voltage regulator of FIG. 1.
Figure 3:
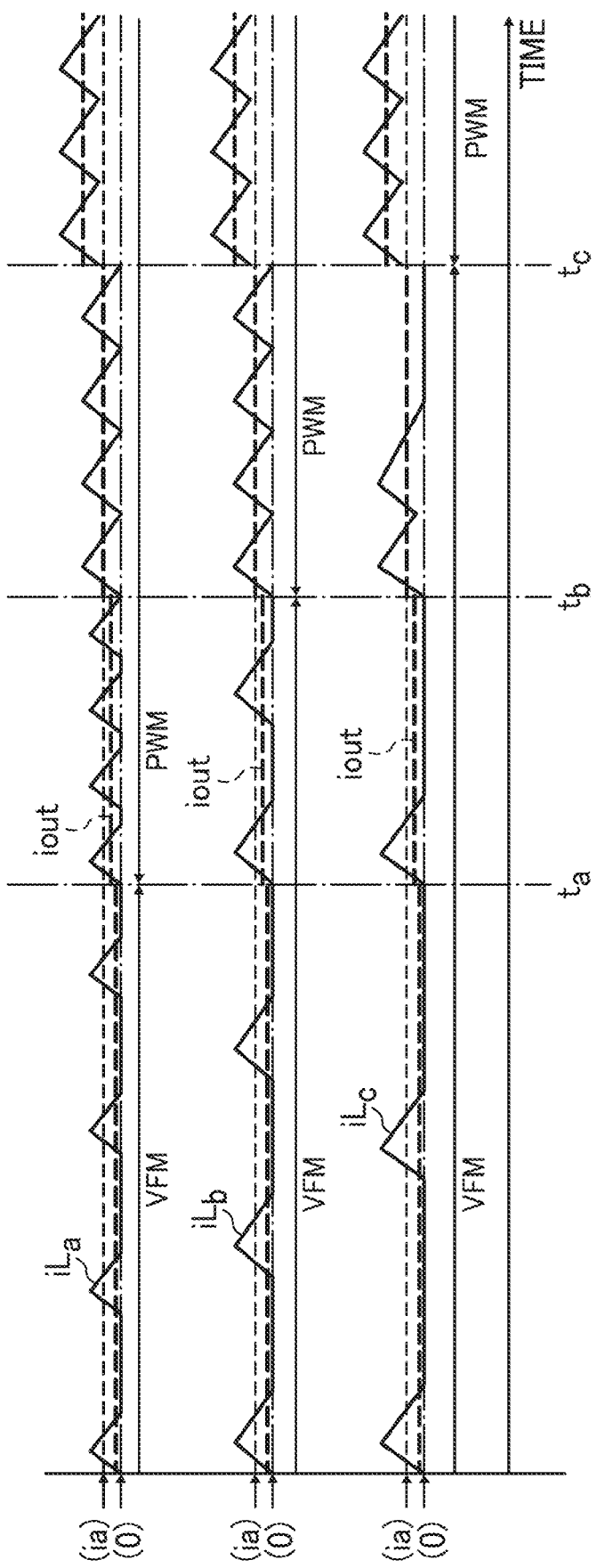
FIG. 3 shows waveforms of an inductor current in the voltage regulator of FIG. 1 during transition from VFM mode to PWM mode.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, examples and exemplary embodiments of this disclosure are described.

Figure 4:
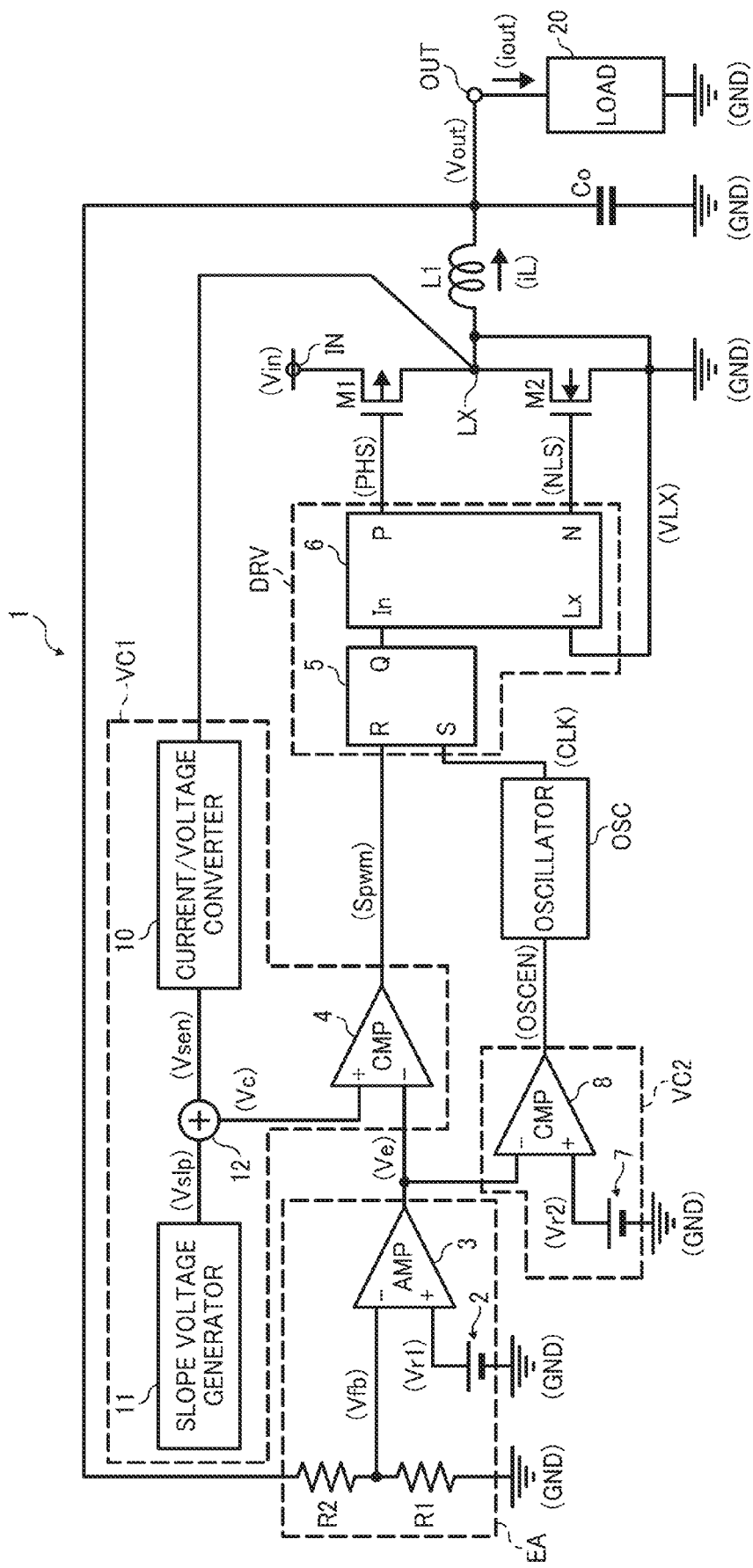
FIG. 4 is a circuit diagram illustrating a non-isolated current-mode-controlled switching voltage regulator according to one embodiment of this patent specification.

FIG. 4 is a circuit diagram illustrating a non-isolated current-mode-controlled switching voltage regulator 1 according to one embodiment of this patent specification.

As shown in FIG. 4, the voltage regulator 1 is configured as a step-down or buck DC-DC converter with synchronous rectification, which converts a voltage Vin input to an input terminal IN to output a constant output voltage Vout to an output terminal OUT for supply to a load circuit 20.

The voltage regulator 1 has an output stage formed of a switching transistor M1 and a synchronous rectifier transistor M2, the former being a P-channel metal-oxide semiconductor (PMOS) transistor and the latter an N-channel metal-oxide semiconductor (NMOS) transistor, with a node LX therebetween connected to an inductor L1 and an output capacitor Co.

The voltage regulator 1 has control circuitry including a pair of voltage sensing resistors R1 and R2, a first reference voltage generator 2, and an error amplifier 3 together forming an error amplifier circuit EA, a first comparator 4, a current/voltage converter 10, a slope voltage generator 11, and an adder circuit 12 together forming a first voltage comparator circuit VC1, a second voltage generator 7 and a second comparator 8 together forming a second voltage comparator circuit VC2, and a reset-set (RS) flip-flop 5 and an inverter or switching controller 6 together forming a driver circuit DRV. Also, the voltage regulator 1 incorporates an oscillator circuit OSC, the detailed configuration of which will be described later with reference to FIG. 5.

In the voltage regulator 1, the output transistors M1 and M2 are connected in series between the input terminal IN and a ground GND, with the node LX therebetween connected to the inductor L1 as well as to the first voltage comparator circuit VC1 and the driver circuit DRV. The inductor L1 is connected between the node LX and the output terminal OUT, and the capacitor Co is connected between the output terminal OUT and the ground GND. The output terminal OUT is connected to the load circuit 20 as well as to the error amplifier circuit EA.

In the error amplifier circuit EA, the resistors R1 and R2 are connected in series between the output terminal OUT and the ground GND to form a voltage divider. The error amplifier 3 has an inverting input connected to the voltage divider, a non-inverting input connected to the first voltage generator 2, and an output connected to the first and second voltage comparator circuits VC1 and VC2.

The voltage divider resistors R1 and R2 output a feedback voltage Vfb proportional to the output voltage Vout, while the first voltage generator 2 outputs a first reference voltage Vr1 for comparison with the feedback voltage Vfb. Based on a difference between the two input voltages Vfb and Vr1, the error amplifier 3 outputs an amplified error voltage Ve at its output terminal, which increases as the output voltage Vout decreases, and decreases as the output voltage Vout increases.

In the first voltage comparator circuit VC1, the current/voltage converter 10 is connected to the inductor node LX. The adder circuit 12 is connected between the current/voltage converter 10 and the slope voltage generator 11. The comparator 4 has an inverting input connected to the output of the error amplifier circuit EA, and a non-inverting input connected to the adder circuit 12.

The current/voltage converter 10 generates a current-sensing voltage Vsen by amplifying a difference between the input voltage Vin and a nodal voltage VLX at the inducer node LX, which is equivalent to the voltage between drain and source terminals of the switching transistor M1. Since the transistor M1 has a constant ON resistance irrespective of a current flowing through its drain terminal, the drain-to-source voltage of the transistor M1 is proportional to the drain current, which is substantially equivalent to a current iL flowing through the inductor L1. The amplified voltage Vsen thus obtained is proportional to the inductor current iL.

The slope voltage generator 11 generates a sawtooth slope voltage Vslp for addition to the current-sensing voltage Vsen, which provides slope compensation to prevent the inductor current iL from sub-harmonic oscillation. The slope voltage Vslp is added to the current-sensing voltage Vsen by the adder circuit 12 to generate a ramp voltage Vc substantially proportional to the inductor current iL.

Receiving the error voltage Ve at one input and the ramp voltage Vc at the other input, the first comparator 4 compares the voltages Vc and Ve against each other to generate a pulse width modulation signal Spwm for output to the driver circuit DRV, which goes high when the voltage Vc exceeds Ve, and low when the voltage Vc falls to Ve or below.

In the second voltage comparator circuit VC2, the second comparator 8 has an inverting input connected to the error amplifier circuit EA, a non-inverting input connected to the second reference voltage generator 7, and an output connected to the oscillator circuit OSC.

The second reference voltage generator 7 generates a second reference voltage Vr2 for comparison with the error voltage Ve. By comparing the error amplifier output Ve against the reference voltage Vr2, the comparator 8 generates an oscillator enable signal OSCEN for output to the oscillator circuit OSC, which goes low when the voltage Ve exceeds Vr2 and high when the voltage Ve falls to Vr2 or below.

The oscillator circuit OCS provides a clock signal CLK to the driver circuit DRV depending on the status of the enable signal OSCEN, which remains low as long as the enable signal OSCEN remains high, and is pulsed or oscillated when the enable signal OSCEN goes low.

Specifically, whenever the signal OSCEN goes low and returns high within a period of time shorter than a threshold time, the oscillator circuit OSC outputs a single high pulse CLK with a predetermined pulse width. When the signal OSCEN remains low during a period of time longer than the threshold time, the oscillator circuit OSC then outputs a waveform signal CLK which oscillates at a frequency constantly increasing from an initial level to a constant level, and then continues oscillation at the constant frequency until the enable signal OSCEN again goes high.

In the driver circuit DRV, the RS flip-flop 5 has a reset or "R" input connected to the first comparator 4, a set or "S" input connected to the oscillator circuit OSC, and a non-inverting or "Q" output connected to the controller 6. The controller 6 has a first input In connected to the flip-flop Q output, a second input Lx connected to the inductor node LX, a first output P connected to the gate of the switching transistor M1, and a second output N connected to the gate of the synchronous rectifier transistor M2.

Receiving the pulse signal Spwm at the R input and the clock signal CLK at the S input, the RS flip-flop 5 causes its Q output to go high when the signal CLK goes high, and to go low when the signal Spwm goes high. The switching controller 6 provides first and second control signals PHS and NLS, respectively, to control operation of the respective transistors M1 and M2 according to the status of the first and second input terminals In and Lx.

Specifically, when the first input In goes high, each of the control signals PHS and NLS goes low, turning on the switching transistor M1 and turning off the synchronous rectifier transistor M2. Conversely, when the first input In goes high, each of the control signals PHS and NLS goes low, turning off the switching transistor M1 and turning on the synchronous rectifier transistor M2. Further, when the nodal voltage VLX input to the second input Lx exceeds 0 volt, the second control signal NLS goes low to turn off the synchronous rectifier transistor M2 regardless of the status of the first input In, which prevents the inductor current iL from flowing backward to the ground GND.

In such a configuration, the voltage regulator 1 can control operation of the switching transistor M1 either in variable frequency modulation (VFM) mode, also referred to as pulse frequency modulation (PFM) mode, or in pulse width modulation (PWM) mode depending on a current iout output to the load circuit 20.

During operation in VFM control mode, the output current iout supplied to the load 20 is relatively low, so that the error voltage Ve output by the error amplifier circuit EA generally remains below the second reference voltage Vr2. The voltage Ve increases inversely with the output voltage Vout gradually decreasing as the output capacitor Co discharges stored energy to the output terminal OUT to supply the load circuit 20.

When the error voltage Ve exceeds the second reference voltage Vr2, the output OSCEN of the second voltage comparator circuit VC2 switches from high to low to enable the oscillator circuit OSC. Upon being enabled, the oscillator circuit OSC outputs a single high pulse to the S input of the RS flip-flop 5, which in turn sets the Q output from low to high. In responses to the first input In going high, the switching controller 6 applies low voltage signals PHS and NLS to the gates of the corresponding transistors, thereby causing the switching transistor M1 to turn on and the synchronous rectifier transistor M2 to turn off.

The switching transistor M1 thus becoming conductive connects the input terminal IN to the inductor node LX. This results in a current iL flowing into the inductor L1 from the input terminal IN, the amount of which increases in proportion to a difference between the input and output voltages Vin and Vout. When the inductor current iL exceeds the current iout output to the load circuit 20, charge builds up in the output capacitor Co to gradually increase the output voltage Vout, resulting in the error voltage Ve decreasing inversely with the output voltage Vout.

Once the voltage Ve falls below the second reference voltage Vr2, the output OSCEN of the second voltage comparator circuit VC2 switches from low to high to disable the oscillator circuit OSC. As the enablement and disablement of the oscillator circuit OSC occurs within the threshold time, the oscillator circuit OSC does not output another pulse CLK until the error voltage Ve again exceeds the threshold voltage VC2.

The status of the inductor current iL is monitored by the first voltage comparator circuit VC1, in which the current/voltage converter 10 generates a current-sensing voltage Vsen proportional to the inductor current iL and outputs a ramp voltage Vc by adding a predetermined slope voltage Vslp to the voltage Vsen.

During ON-time of the switching transistor M1, the ramp voltage Vc gradually increases from the ground level GND in accordance with the increase in the inductor current iL. When the ramp voltage Vc exceeds the error voltage Ve, the output Spwm of the first comparator 4 goes from low to high, causing the RS flip-flop 5 to reset the Q output from high to low. In response to the first input In going low, the switching controller 6 applies high voltage signals PHS and NLS to the gates of the corresponding transistors, thereby causing the switching transistor M1 to turn off and the synchronous rectifier transistor M2 to turn on.

With the switching transistor M1 thus shut off, the voltage VLX at the inductor node LX becomes negative due to a counter-electromotive force developed across the inductor L1. Accordingly, the current-sensing voltage Vsen proportional to the inductor current L1, together with the slope voltage Vslp, falls to the ground level GND. This means the sum Vc of the voltages Vsen and Vslp falls to the ground voltage GND, resulting in the pulse signal Spwm going from high to low immediately after resetting the RS flip-flop 5 and turning off the switching transistor M1.

As the transistor M1 shut off no longer connects the input terminal IN to the inductor node LX, the inductor L draws a current iL from the ground GND through the synchronous rectifier transistor M2, the amount of which gradually decreases in proportion to the output voltage Vout.

When the voltage VLX at the inductor node LX becomes 0 volt, the controller 6 outputs a low voltage signal NLS to turn off the transistor M2 irrespective of the input signal In from the RS flip-flop 105. This prevents a backflow of current from the output terminal OUT to the ground GND through the inductor L1 and the transistor M2 when the inductor L1 discharges all stored energy and the inductor current iL becomes zero, which would otherwise result in a significant reduction in the energy conversion efficiency of the switching regulator.

The output voltage Vout starts to decrease when the inductor current iL falls below the output current iout, resulting in the error voltage Ve inversely increasing to exceed the reference voltage Vr2. This enables the oscillator circuit OSC to output a single pulse CLK to start another operational cycle of the voltage regulator 1.

During VFM-controlled operation described above, the smaller the output current iout, the faster the output voltage Vout increases and the error voltage Ve decreases, resulting in a shorter period of time during which the switching transistor M1 remains on. On the other hand, the smaller the output current iout, the slower the output voltage Vout decreases, resulting in a longer period of time during which the switching transistor M1 remains off. With an output current sufficiently small, this results in a longer time interval and a smaller frequency with which the switching transistor M1 turns on.

The voltage regulator 1 switches control mode from VFM mode to PWM mode when the output current iout increases to raise the switching frequency, maintaining the error voltage Ve higher than the second reference voltage Vr2.

During operation in PWM control mode, the output current iout supplied to the load 20 is relatively high, so that the error voltage Ve output by the error amplifier circuit EA generally remains above the second reference voltage Vr2. Thus, the output OSCEN of the second voltage comparator circuit VC2 remains low to cause the oscillator circuit OSC to output a periodic pulse clock signal CLK oscillating at a constant frequency.

When the clock signal CLK goes high, the RS flip-flop 5 sets the Q output from low to high, so that the switching controller 6 causes the switching transistor M1 to turn on and the synchronous rectifier transistor M2 to turn off. This causes a current iL to flow into the inductor L1 from the input terminal IN, the amount of which increases in proportion to a difference between the input and output voltages Vin and Vout.

At the same time, the first voltage comparator circuit VC1 generates a ramp voltage Vc by adding a slope voltage Vslp to a voltage Vsen proportional to the inductor current iL, which increases from the ground level GND in accordance with the increase in the inductor current iL.

When the voltage Vc exceeds the error voltage Ve, the output Spwm of the first comparator 4 goes from low to high, causing the RS flip-flop 5 to reset the Q output from high to low. In response to the first input In going low, the controller 6 applies high voltage signals PHS and NLS to the gates of the corresponding transistors, thereby causing the switching transistor M1 to turn off and the synchronous rectifier transistor M2 to turn on.

With the switching transistor M1 thus shut off, the ramp voltage Vc falls to the ground voltage GND, resulting in the output Spwm of the first comparator 4 going from high to low. As the transistor M1 shut off no longer connects the input terminal IN to the inductor node LX, the inductor L draws a current iL from the ground GND through the synchronous rectifier transistor M2, the amount of which gradually decreases in proportion to the output voltage Vout.

Before the inductor current iL falls to zero, the oscillator circuit OSC outputs another pulse CLK to start another operational cycle of the voltage regulator 1. Thus, the voltage regulator 1 operates in continuous mode in which the inductor current iL is continuously output to the load circuit 20, never reaching the baseline level.

During PWM-controlled operation described above, the greater the output current iout, the shorter the period of time during which the switching transistor M1 remains on. In order for the voltage regulator 1 to smoothly change its control mode, properly setting the inductor current iL during transition from VFM mode to PWM mode is important.

Figure 5:
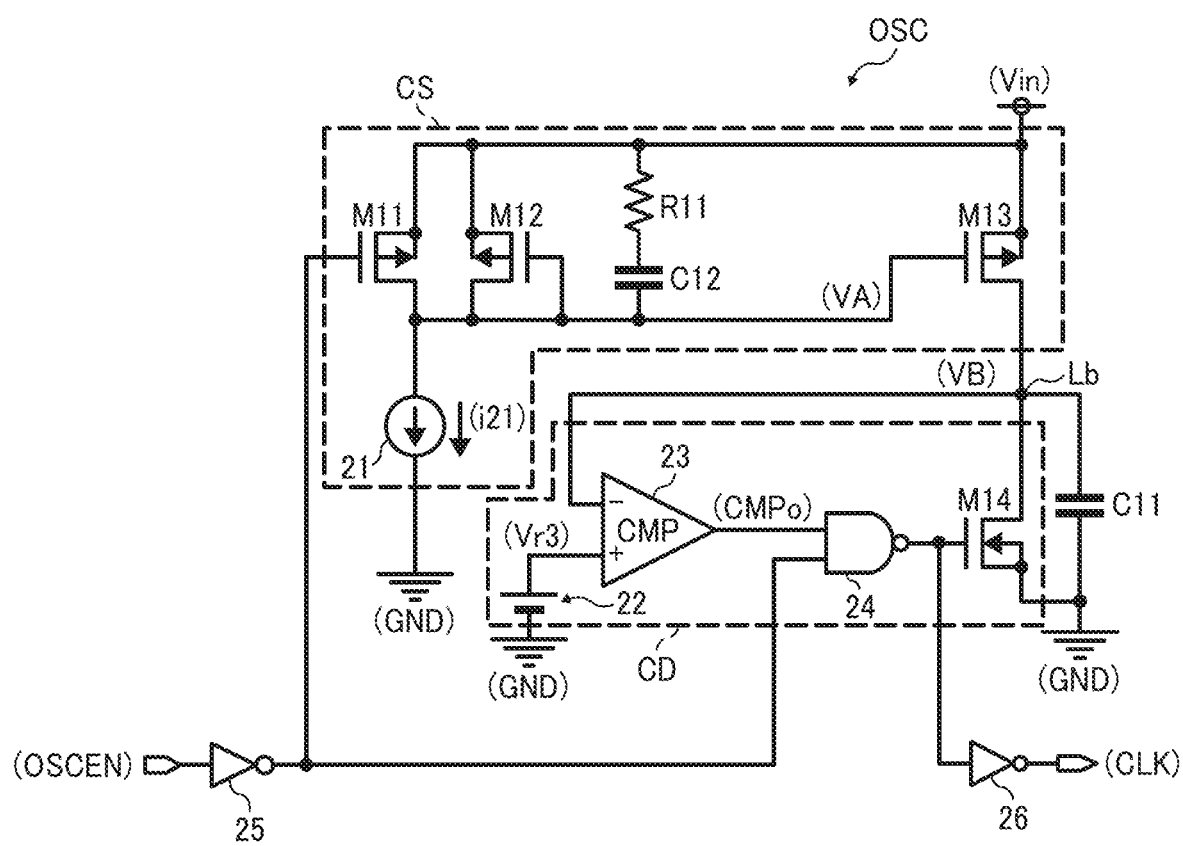
FIG. 5 is a circuit diagram illustrating an oscillator circuit incorporated in the voltage regulator 1 of FIG. 1.

FIG. 5 is a circuit diagram illustrating the oscillator circuit OSC of the voltage regulator 1 according to one embodiment of this patent specification.

As shown in FIG. 5, the oscillator circuit OSC includes first and second logic NOT gates or inverters 25 and 26, a current source circuit CS, a current discharge circuit CD, and a first capacitor C11. The current source circuit CS is formed of PMOS transistors M11 through M13, a resistor R11, a second capacitor C12, and a constant current source 21 supplying the circuit OSC with a predetermined constant current i21. The current discharge circuit CD is formed of a third comparator 23, a logic NAND gate 24, an NMOS transistor M14, and a third reference voltage generator 22 generating a predetermined third reference voltage vr3.

In the oscillator circuit OSC, the enable signal OSCEN input from the second voltage comparator circuit VC2 is connected to both the current source circuit CS and the current discharge circuit CD through the first inverter 25.

In the current source circuit CS, the PMOS transistor M11 and M12 are connected in parallel between the input voltage Vin and the gate of the PMOS transistor M13, with the transistor M11 having its gate connected to the output of the first inverter 25, and the transistor M12 having its gate and drain connected together. The transistors M12 and M13, having a common gate voltage VA applied to their gates, form a current mirror circuit to conduct drain currents proportional to each other.

The resistor R11 and the second capacitor C12 is connected in series between the input voltage Vin and the gate of the PMOS transistor M13. The constant current source 21 is connected between the drain of the transistor M11 and the ground GND. The PMOS transistor M13 has the source connected to the input voltage Vin and the drain connected to a node Lb, which is supplied with a voltage VB.

In the discharge circuit CD, the NMOS transistor M14 is connected in parallel with the first capacitor C11 between the node Lb and the ground GND. The third comparator 23 has an inverting input connected to the node Lb (i.e., the drain of the transistor M14), and a non-inverting input connected to the output Vr3 of the reference voltage generator 22 to output a binary signal CMPo. The NAND gate 24 has one input connected to the output of the comparator 23, another input connected to the output of the first inverter 25, and an output connected to the gate of the transistor M14.

The output of the NAND gate 24 is also connected to the output terminal of the oscillator circuit OSC through the second inverter 26, which provides a clock signal CLK to the driver circuit DRV of the voltage regulator 1.

The following describes operation of the oscillator circuit OSC with additional reference to FIGS. 6A and 6B, which are diagrams showing waveforms of the enable signal OSCEN, the gate voltage VA of the PMOS transistor M13, the voltage VB at the node Lb, the comparator output CMPo, and the clock signal CLK varying with time in the oscillator circuit OCS operating in VFM control mode and during transition from VFM mode to PWM mode, respectively.

As shown in FIG. 6A, during VFM-controlled operation, the enable signal OSCEN input from the second voltage comparator circuit VC2 is high at time t0 when the output voltage Vout is relatively large and the error voltage Ve is below the reference voltage Vr2. At this point t0, the first inverter 25 inverting the high signal OSCEN outputs a low signal OSCEN* to the current source circuit CS and to the current discharge circuit DS.

In the current source circuit CS, the low voltage OSCEN* applied to the gate of the PMOS transistor M11 causes the transistor M11 to conduct, which in turn causes the PMOS transistors M12 and M13 to shut off with the voltage VA applied to their gates substantially equal to the input voltage Vin.

In the discharge circuit DS, the NAND gate 24 receiving the low signal OSCEN* at its input outputs a high signal to the gate of the transistor M14 and to the second inverter 26. The high output of the NAND gate 24 causes the NMOS transistor M14 to conduct to discharge the capacitor C11 therethrough. This maintains the voltage VB at approximately the ground voltage GND, which in turn maintains the output CMPo of the comparator 23 at a high level. The inverter 26 inverts the output of the NAND gate 24 to output a low signal CLK.

Then, the enable signal OSCEN switches from high to low as the output voltage Vout gradually decreases and the error voltage Ve correspondingly increases to exceed the reference voltage Vr2 at time t1. At this point t1, the inverted version OSCEN* of the enable signal simultaneously switches from low to high.

In the discharge circuit DS, the NAND gate 24 receiving the high signal OSCEN* at one input and the high signal CMPo at another input outputs a low signal to the gate of the transistor M14 and to the second inverter 26. The low output of the NAND gate 24 causes the NMOS transistor M14 to shut off, and the inverter 26 to output a high signal CLK.

In the current source circuit CS, the high voltage OSCEN* applied to the gate of the PMOS transistor M11 causes the transistor M11 to shut off, so that the constant current i21 flows through the resistor R11 and the capacitor C12 connected in series to the constant current source 21. As a result, the voltage VA drops sharply by an amount determined by a product of the current i21 and the value of the resistor R11.

The reduction in the voltage VA means a bias voltage is applied to the gates of the transistors M12 and M13 forming a current mirror, resulting in the transistors M12 and M13 conducting drain currents proportional to each other. As the transistor M14 is shut off, the drain current output from the transistor M13 is supplied to charge the first capacitor C11, so that the voltage VB at the node Lb gradually increases after time t1.

The clock signal CLK switching from low to high at time t1 sets the RS flip-flop 5 to output a high signal to the controller 6, which then causes the switching transistor M1 to turn on and the synchronous rectifier transistor M2 to shut off. With the switching transistor M1 thus becoming conductive, the inductor L1 is charged with the input voltage Vin, causing the output voltage Vout to increase and the error voltage Ve to decrease.

As the error voltage Ve falls below the reference voltage Vr2, the enable signal OSCEN switches from low to high at time t2. This causes the clock signal CLK to switch from high to low, and remain low until the enable signal OSCEN again goes low at time t3. At the same time, the source circuit CS reduces the gate voltage VA to shut off the transistor M13, while the discharge circuit CD turns on the transistor M14 to discharge the capacitor C11 therethrough, causing the voltage VB to return to the ground level GND.

The procedure depicted in FIG. 6A is repeated in the oscillator circuit OSC to supply the voltage regulator 1 with discrete clock pulses CLK during VFM-controlled operation.

As the output current iout increases in the voltage regulator 1, the control mode switches from VFM mode to PWM mode where the output voltage Vout is sufficiently low so that the error voltage Ve remains above the reference voltage Vr2.

As shown in FIG. 6B, during PWM-controlled operation, the oscillator circuit OSC outputs a low signal CLK at time t10 when the enable signal OSCEN input from the second voltage comparator circuit VC2 is high, as in the case of VFM control mode.

Then, at time t11, the enable signal OSCEN switches from high to low so that the inverted signal OSCEN* switches from low to high.

In the discharge circuit DS, the NAND gate 24 switches its output from high to low in response to the high signal OSCEN*. The low output of the NAND gate 24 turns off the NMOS transistor M14 and causes the inverter 26 to output a high signal CLK.

In the current source circuit CS, the transistor M11 shuts off in response to the high voltage OSCEN* applied to its gate, so that the constant current i21 flows through the resistor R11 and the capacitor C12 connected in series to the constant current source 21. As a result, the voltage VA drops sharply by an amount determined by a product of the current i21 and the value of the resistor R11.

The reduction in the voltage VA means a bias voltage is applied to the gates of the transistors M12 and M13 forming a current mirror, resulting in the transistors M12 and M13 conducting drain currents proportional to each other.

As the transistor M14 is shut off, the drain current output from the transistor M13 is supplied to charge the first capacitor C11, so that the voltage VB at the node Lb gradually increases after time t11. When the voltage VB exceeds the third reference voltage Vr3, the comparator 23 switches its output CMPo from high to low at time t12.

Upon receiving the low signal CMPo at one input and the high signal OSCEN* at another input, the NAND gate 24 switches its output from low to high to turn on the NMOS transistor M14. Once switched on, the transistor M14, which has a low ON impedance, immediately discharges the capacitor C11 therethrough to reduce the voltage VB to the ground level GND.

The reduction in the voltage VB causes the comparator 23 to switches its output CMPo from low to high at time t13, which in turn causes the NAND gate 24 to switch its output from high to low, resulting in the NMOS transistor M14 turning off to charge the capacitor C11 with the drain current of the transistor M13, and the inverter 26 to output a high signal CLK, thereby completing one cycle of operation.

The procedure depicted in FIG. 6B is repeated in the oscillator circuit OSC to supply the voltage regulator 1 with pulses CLK during transition from VFM mode to PWM mode.

In contrast to the VFM control operation described in FIG. 6A, the enable signal OSCEN, once switched from high to low, continuously remains low after time t11 during PWM control operation. As a result, the voltage VA gradually decreases after the initial sharp drop as the capacitor C11 is charged by the constant current i21 after time t11, reaches a constant level at time t20, and remains at this level after time t20. In accordance with the gradual decrease of the voltage VA, the drain current of the transistor M12 increases toward the constant level i21, so that the drain current of the transistor M13 increases toward a certain level corresponding to the constant current i21.

It is to be noted that the slope or rate at which the voltage VB increases from the ground level GND gradually increases from time t11 to time t20, since the drain current of the transistor M13 charging the capacitor C11 gradually increases until the gate voltage VA of the transistor M13 reaches the constant level at time t20. This means that the period or duration of one cycle of the clock signal CLK gradually decreases during transition from VFM mode to PWM mode occurring between time t11 and time t20, and stabilizes at a predetermined constant level after entering PWM mode at time t20.

Figure 7:
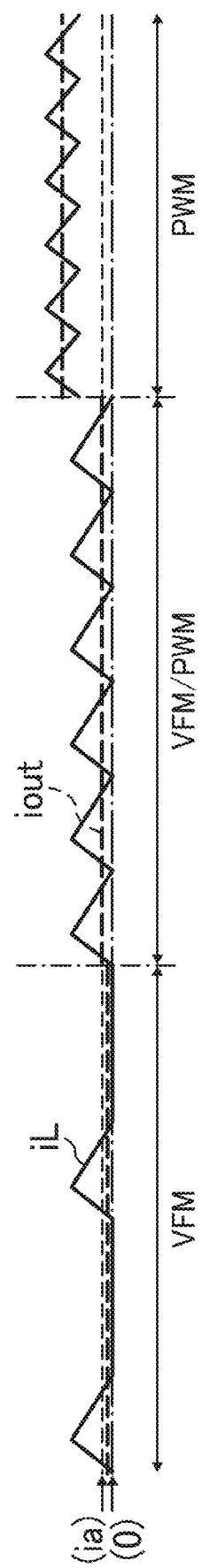
FIG. 7 shows a waveform of an inductor current measured in the voltage regulator of FIG. 1 switching the control mode from VFM mode to PWM mode.

FIG. 7 shows a waveform of the inductor current iL measured in the voltage regulator 1 switching the control mode from VFM mode to PWM mode.

As shown in FIG. 7, during VFM-controlled operation, the voltage regulator 1 is in discontinuous mode where the inductor current iL falls to and remains at zero during part of one operation cycle. On the other hand, during PWM-controlled operation, the voltage regulator 1 is in continuous mode where the inductor current iL never falls to zero during one operational cycle.

When transition from VFM to PWM control mode occurs, the input current iout is held at a critical current ia with which the switching regulator changes the operation mode from discontinuous to continuous mode with the inductor current iL falling to zero exactly at the end of one operational cycle. Such a configuration can be achieved by adjusting the second reference voltage Vr2 which is compared with the error voltage Ve to cause the voltage regulator to switch the control mode.

Thus, the voltage regulator 1 can smoothly switch the operation mode from VFM mode to PWM mode without causing variations in the output voltage Vout.

Further, the output current iout during transition from VFM to PWM control mode may be set higher than the critical current ia with which the switching regulator enters continuous mode during PWM-controlled operation, since the clock pulses output by the oscillator circuit OSC immediately after starting oscillation have frequencies lower than that of the periodic pulse at which the switching regulator operates in PWM control mode. This translates into higher energy output per one operational cycle, and hence reduced switching frequency and increased energy conversion efficiency of the switching regulator operating in VFM control mode.

Moreover, the energy conversion efficiency during VFM control mode operation can be maximized by setting the energy output per operational cycle equal to that output when the switching regulator enters continuous mode during PWM control mode operation.

Although in the embodiment above, the voltage regulator 1 is depicted as a step-down voltage regulator featuring synchronous rectification, the voltage regulation using the oscillator circuit according to this patent specification may be various types of step-down and/or step-up switching regulators, for example, a diode-based step-down converter having no synchronous rectifier.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. JP-2008-226789-A filed on Sep. 4, 2008 in the Japanese Patent Office, the entire contents of which are hereby incorporated by reference herein.

What is claimed is:

1. A non-isolated current-mode-controlled switching voltage regulator that converts a voltage input to an input terminal to output a constant output voltage to an output terminal while switching control mode between PWM mode and VFM mode depending on a current output to the output terminal, the voltage regulator comprising:
   an inductor connected between the input terminal and the output terminal;
   a switching transistor to charge the inductor with the input voltage by switching on and off according to a switching control signal;
   a rectifier to discharge the inductor when the switching transistor switches off;
   an error amplifier circuit to amplify a difference between a first reference voltage and a feedback voltage proportional to the output voltage, and output an error voltage indicating the amplified voltage difference;
   a first voltage comparator circuit to compare the error voltage against a ramp voltage generated by adding a slope compensation voltage to a current-sensing voltage corresponding to a current flowing through the inductor, and output a modulation signal pulsed to indicate a result of comparison between the error voltage and the ramp voltage;
   a second voltage comparator circuit to compare the error voltage against a second reference voltage, and activate an enable signal when the error voltage exceeds the second reference voltage;
   an oscillator circuit to output a clock signal with a fixed frequency according to the enable signal,
   the oscillator circuit entering a first state when the enable signal is activated and deactivated within a period of time shorter than a threshold time, and entering a second state when the enable signal remains activated during a period of time longer than the threshold time,
   the clock signal being pulsed with a variable frequency when the oscillator circuit is in the first state, and oscillating with a frequency constantly increasing from an initial level before stabilizing at the fixed frequency when the oscillator circuit is in the second state; and
   a driver circuit to generate the switching control signal based on the clock signal and the modulation signal,
   the switching control signal causing the switching transistor to turn on in response to a pulse in the clock signal, and to turn off in response to a pulse in the modulation signal.

2. The voltage regulator according to claim 1, wherein the threshold time is a period of time equal to a reciprocal of the fixed frequency.

3. The voltage regulator according to claim 1, wherein the oscillator circuit includes:
   a capacitor;
   a current source circuit to charge the capacitor with a supply current constantly increasing toward a constant current level upon activation of the enable signal; and
   a discharge circuit to discharge the capacitor when a terminal voltage across the capacitor exceeds a threshold voltage.

4. The voltage regulator according to claim 1, wherein the second reference voltage is adjusted to switch the control mode from VFM mode to PWM mode when the output current reaches a critical current with which the voltage regulator enters a continuous operation mode from a discontinuous operation mode.

5. The voltage regulator according to claim 1, wherein the rectifier comprises a synchronous rectifier transistor to discharge the inductor by switching on and off according to a rectification control signal generated by the driver circuit,
   the synchronous rectifier transistor turning off simultaneously with the switching transistor turning on to charge the inductor,
   the synchronous rectifier transistor turning on simultaneously with the switching transistor turning off to discharge the inductor.

6. The voltage regulator according to claim 5, wherein the driver circuit monitors a nodal voltage at a node between the switching transistor and the inductor, and shuts off the synchronous rectifier transistor when the nodal voltage indicates occurrence of a current backflow from the output terminal toward the synchronous rectifier transistor.

* * * * *